March 25, 1958     D. H. CAMPBELL     2,827,710
CAMSHAFT GAUGE
Filed Oct. 31, 1955     2 Sheets-Sheet 2
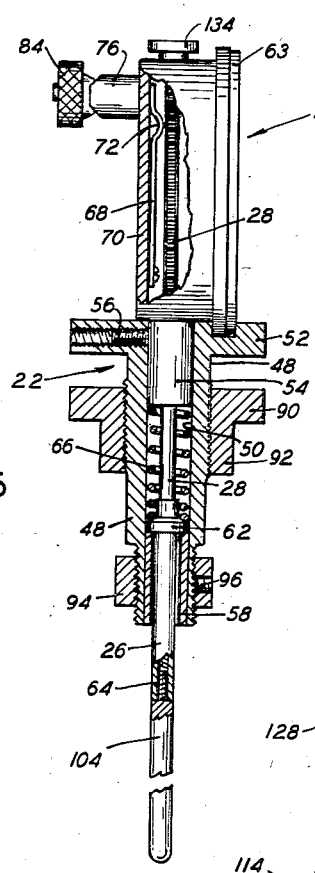
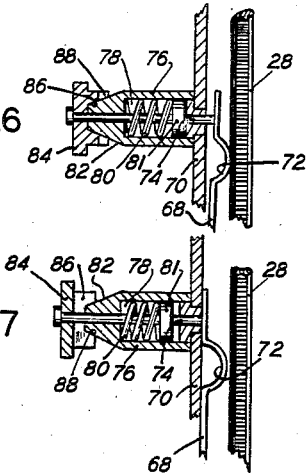
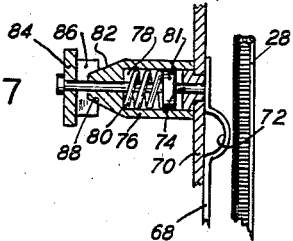
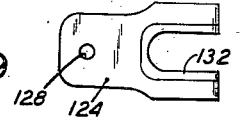
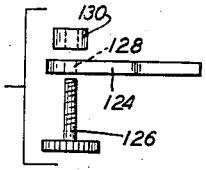
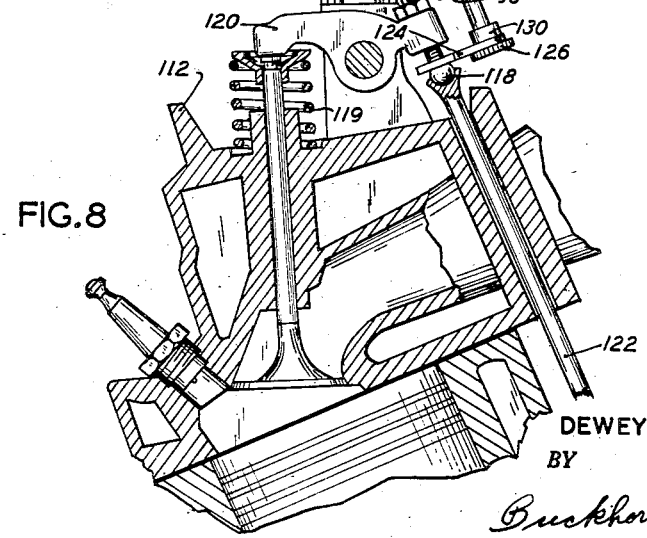
INVENTOR.
DEWEY H. CAMPBELL
BY
*Buckhorn and Cheatham*
ATTORNEYS United States Patent Office 2,827,710
Patented Mar. 25, 1958

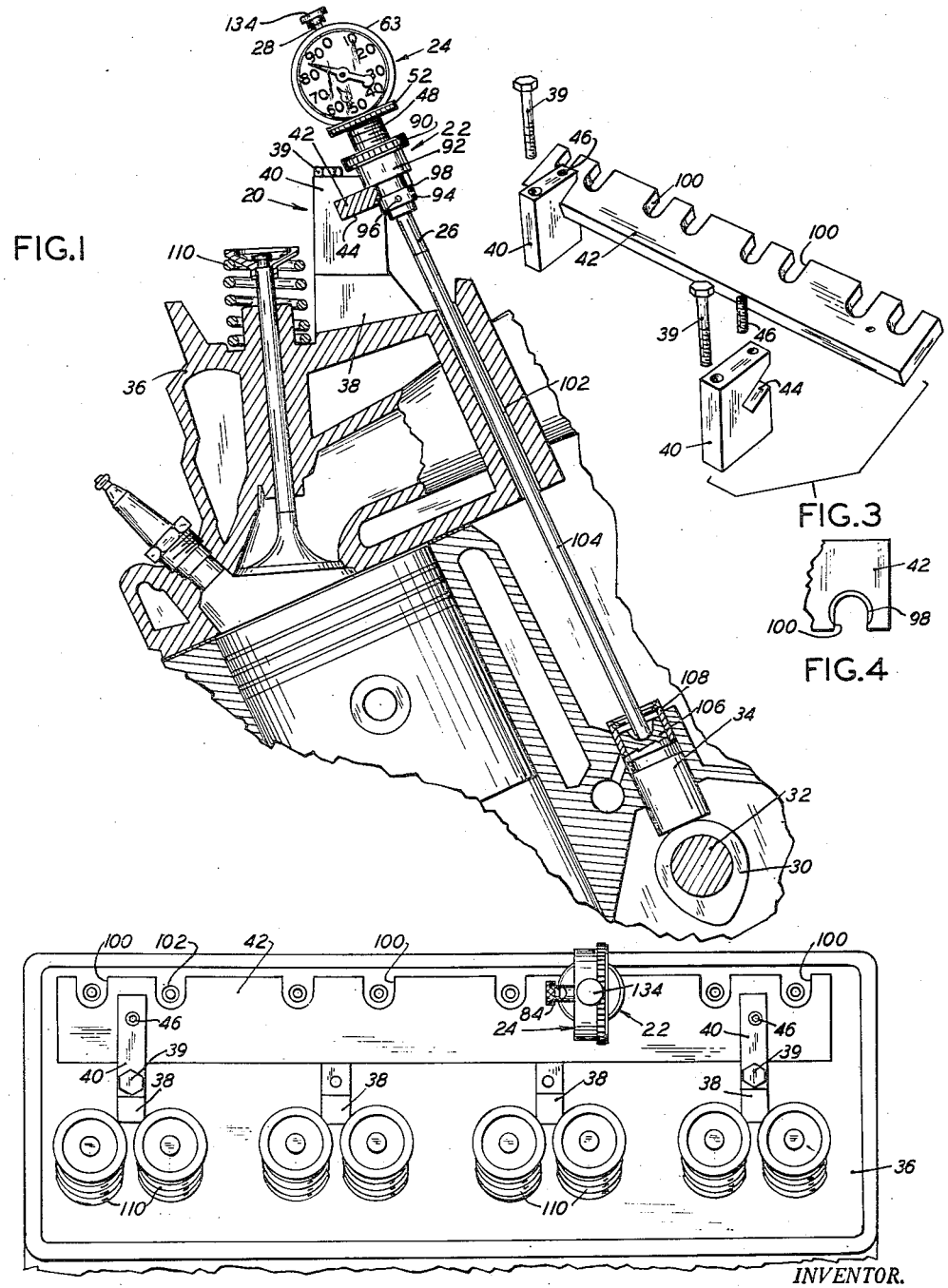

2,827,710

CAMSHAFT GAUGE

Dewey H. Campbell, Portland, Oreg., assignor to P. & G. Manufacturing Co., Portland, Oreg., a corporation of Oregon Application October 31, 1955, Serial No. 543,665

4 Claims. (Cl. 33—180)

This invention relates to a camshaft gauge and more particularly to a gauge structure for accurately measuring the throw of the cams on the camshaft of an internal combustion engine in order to determine whether wear of such cams has occurred.

The gauge of the present invention enables the throw of the cams on a camshaft of an internal combustion engine of the valve-in-head type to be accurately measured in an effective and rapid manner with only slight disassembling of the engine. Prior methods of measuring the throw of such cams have required the removal of the camshaft from the engine. The gauge of the present invention eliminates the necessity of removing the camshaft from the engine. With engines having mechanical valve lifters, i. e., rigid lifters of the non-hydraulic type, it is merely necessary to remove the covers for the valve actuating mechanism on top of the cylinder heads, while with engines having hydraulic valve lifters it is merely necessary to additionally remove the valve actuating rocker arms and push rods. This is, however, a very simple operation as compared to removing the camshaft from the engine, the latter operation requiring almost a complete disassembly of the front end portion of the engine and also the removal of the radiator and associated parts of the automobile or other structure in which the engine is installed. With the gauge of the present invention, the condition of the cams of the camshaft can be determined in a relatively short time and such determination can become a part of an engine tuneup or operation check rather than deferring the checking of the cams until a major overhaul of the engine is performed.

It is therefore an object of the present invention to provide a camshaft gauge for measuring the throw of the cams of a camshaft of an internal combustion engine, the use of which gauge requires only minor disassembling of the engine.

Another object of the invention is to provide a gauge structure which can be positioned to accurately measure the throw of the cams of the camshaft of an internal combustion engine of the valve-in-head type by merely removing the cover for the valve actuating mechanism on the cylinder head of the engine and in some cases portions of such valve actuating mechanism.

A further object of the invention is to provide a gauge structure which can be positioned to measure the throw of the cams of a camshaft of an internal combustion engine of the valve-in-head type having mechanical valve lifters by merely removing the cover for the valve actuating mechanism on top of the cylinder head and attaching the gauge structure.

A further object of the invention is to provide a gauge structure which can be positioned for measuring the throw of the cams of the camshaft of an internal combustion engine of the valve-in-head type having hydraulic valve lifters by merely removing the cover for the valve actuating mechanism on the head of the engine and the rocker arms and push rods and attaching such gauge structure.

Other objects and advantages of the invention will appear in the following description of preferred embodiments thereof shown in the attached drawings of which:

Fig. 1 is a fragmentary vertical sectional view taken transversely through an internal combustion engine of the valve-in-head type having hydraulic valve lifters showing the camshaft gauge of the present invention in position for measuring the throw of the cams;

Fig. 2 is a top view of a portion of the device of Fig. 1;

Fig. 3 is a perspective view showing the support means of the gauge structure partially disassembled;

Fig. 4 is a partial bottom view showing one end of the bar forming a part of the support means of Fig. 3;

Fig. 5 is a vertical section on an enlarged scale through the holding means of the gauge structure with a portion of the case of the dial indicator broken away;

Fig. 6 is a fragmentary vertical sectional view showing a portion of the brake for the dial indicator in the brake applied position on a still larger scale;

Fig. 7 is a view similar to Fig. 6 showing the brake in released position;

Fig. 8 is a view similar to Fig. 1 showing a modified device for engines having mechanical lifters;

Fig. 9 is a side elevation of a feeler element employed with the device of Fig. 8; and Fig. 10 is a side elevation of the element of Fig. 9 and the attaching elements therefor.

Referring to Fig. 1, the device shown therein includes a support means 20 for supporting a holding means 22 for a dial indicator 24, the holding means having a movable element in the form of an extension plunger 26 for actuating the plunger 28 (Fig. 5) of the dial indicator. The gauge of Fig. 1 is useful in measuring the throw of the cams 30 on the camshaft 32 of a valve-in-head type of internal combustion engine having hydraulic valve lifters 34. After the cover (not shown) for the valve actuating mechanism on top of the head 36 has been removed and the usual rocker arms and valve lifter rods have likewise been removed, the support means 20 may be attached to the top of the head 36, for example, to bosses 38 normally supporting the bearings for the rocker arm shaft of the engine, the support means having standards 40 attached to the bosses 38 by bolts 39 and supporting a notched bar 42 positioned in inclined slots 44 in the standards and held in position by set screws 46.

As shown more clearly in Fig. 5, the holding means 22 for the dial indicator 24 includes a cylindrical body member 48 having a concentric bore 50 extending therethrough and an enlarged knurled knob 52 at its upper end. The sleeve 54 which extends from the casing of a conventional dial indicator and which forms a bearing for the plunger 28 is received within the upper end of the bore 50 and held in position by a set screw 56 in a radially extending threaded hole in the knob 52. The lower end of the bore 50 has a bushing 58 positioned therein, the bushing 58 preferably being a press fit in the bore. The bushing 58 forms a sliding bearing for the extension plunger 26 which plunger has a head 62 at its upper end and a screw threaded bore 64 at its lower end. A compression spring 66 is positioned within the bore 50 between the sleeve 54 and the head 62 on the extension plunger 60. The dial indicator 24 has a revolvable dial 63 and conventionally contains a spring (not shown) for urging the plunger 28 in a direction outwardly of the sleeve, i. e., in a downwardly direction in Fig. 5. The spring 66 also urges the extension plunger 60 in the same direction and it will be apparent that any motion of the extension plunger 60 inwardly of the cylindrical member 48 will move the plunger 28 to actuate the dial indicator.

The dial indicator 24 shown in the various drawings has been modified to include a brake for the plunger 28, such brake including a leaf spring 68 (Figs. 5, 6 and 7) attached at one end to the rear cover member 70 of the dial indicator and having an arched portion 72 adjacent but spaced from its other end. Such other end of the leaf spring 68 is biased toward a brake release position shown in Fig. 7 and is positioned to be engaged by a spring pressed plunger 74 extending through the cover member 70, the plunger 74 having a brake applying position (Fig. 6) and a brake release position (Fig. 7). The plunger 74 is mounted coaxially in a cylindrical casing 76 suitably secured to the cover 70. The casing 76 has guiding portions at its ends for the plunger 74 and an internal enlarged bore 78 for receiving a compression spring 80 extending between the upper end of the bore 78 and a collar 81 on the plunger 74 so that the plunger is urged toward brake applying position of Fig. 6. The casing 76 has diametrically opposed inclined end surfaces 82 at its outer end and a knob 84 attached to the outer end of the plunger 74 has a notch 86 extending diametrically thereacross and another notch 88 of lesser depth also extending diametrically thereacross at right angles to the notch 86. When the outer end of the casing 76 having the surfaces 82 thereon is engaged in the deeper notch 86, the spring 80 forces the plunger 74 against the leaf spring 68 to move it to brake applying position against the plunger 28 and when the knob 84 is turned 90 degrees so that the end of the casing 76 having the surfaces 82 is engaged in the notch 88 of lesser depth, the plunger 74 is withdrawn to enable the leaf spring 78 to return to brake releasing position.

The body member 48 of the holding means 22 for the dial indicator has the intermediate portion thereof screw threaded to receive an internally threaded knob 90 having a lower sleeve portion 92 for engaging the upper surface of the bar 42 of the support means (Fig. 1). The lower end of the body member 48 is of reduced diameter and screw threaded to receive an internally screw threaded collar 94 held in adjusted position thereon by set screw 96. The collar 94 is received within any one of a plurality of recesses 98 (Fig. 4) in the lower surface of the bar 42, the recesses 98 partially surrounding notches 100 in the edge of the bar 42. The notches 100 receive the intermediate portion of the cylindrical body member 48 which extends between the sleeve 92 and the collar 94. When the bar 42 is secured by means of the standards 40 to the head of the cylindrical block, the notches 100 are in alignment with bores 102 through which the valve push rods of the engine normally extend and are thus in alignment with the valve filters.

For measuring the throw of the cams 30 of an engine having hydraulic valve lifters, the rocker arms and valve push rods are first removed as above described and the support means including the bar 42 and standards 40 secured in position. An extension rod 104 having a screw threaded portion of reduced diameter at its upper end is screw threaded into the extension plunger 26 and is inserted through a bore 102 as to have its lower end engaged in the upper end of a hydraulic valve lifter 34. Such hydraulic valve lifters each contain a compression spring (not shown) which urges an inner member 106 to an upper position with respect to an outer member 108 against a stop which limits the upward motion of the inner member 106 relative to the outer member. The spring 66 in the bore 50 of the holding means 22 must have substantially less spring force than the spring in the valve lifter 34 and the same is true of the plunger spring in the dial indicator 24 so that the sum of the forces of the springs urging the extension plunger 26 and rod 104 toward the valve lifter is less than the force of the spring in the valve lifted. Otherwise an erroneous reading upon the dial indicator will be obtained. The main reason why the rocker arms are removed along with the usual valve push rods is to prevent the much stronger valve springs 110 from compressing the springs in the valve lifters 34.

The sequence of steps employed with the gauge of Figs. 1 to 8 is to first remove the cover for the valve actuating mechanism and then the rocker arms and push rods forming the operating connection between the valve lifters 34 and the valves. A support means 20 appropriate for the engine being tested including the standards 40 carrying the bar 42 is then installed. An appropriate extension rod 104 is then attached to the extension plunger 26. The holding means 22 carrying the dial indicator 24 is then slipped into a selected slot 100, it being understood that the extension rod 104 is first inserted in the corresponding bore 102 from which a valve pusher rod has been removed. The collar 94 of the holding means is engaged in the recess 98 of the bar 42 and then the knob 90 is rotated to tighten its sleeve 92 against the upper surface of the bar 42. The extension rod 104 should have a length such that the indicator needle of the dial indicator is moved at least a few thousandths of an inch when the cam 30 is in its minimum throw position so that there is assurance of contact between the extension rod 104 and the valve lifter 34 and also contact between the extension plunger 60 and the plunger 28 of the dial indicator.

With the brake of the dial indicator released, the engine is slowly turned over either with the starter or by hand until a minimum reading is obtained upon the dial indicator. Such a minimum reading is easy to obtain as the cams of the usual internal combustion engine have an extended dwell at the minimum throw portion. The dial of the dial indicator is then revolved to bring the zero graduation thereof beneath the pointer at such minimum reading. The knob 84 of the brake of the dial indicator is then turned so as to allow the spring 80 to move the leaf spring 68 into braking position with such leaf spring in engagement with the side of the plunger 28. The engine is then again turned over so as to rotate the cam 30 past its position of maximum throw relative to the valve lifter 34, i. e., past the position where the high point on the cam engages the lifter. The brake retains the plunger of the dial indicator in a position corresponding to the position of maximum throw of the cam such that the pointer of the dial indicator reads the actual throw of the cam. The high point of the lobe of the cam is of such slight angular extent that it is practically impossible to obtain a reading corresponding to the maximum throw of the cam in the absence of the brake.

The dial indicator can be quickly and easily moved from one position to another so as to rapidly test all of the cams on the camshaft and if any of the cams have a throw which departs materially from the predetermined throw normal for such cams, the camshaft should be replaced. The gauge of the present invention thus enables the condition of the camshaft to be rapidly obtained with a minimum of disassembling of the motor.

For internal combustion engines having mechanical lifters, the operation is even simpler. A portion of such a motor is shown in cross section in Fig. 8 and in such case it is only necessary to remove the cover (not shown) for the cam actuating mechanism upon the top of the cylinder head 112. Standards 114 carrying a bar 116 similar to the bar 42 of Fig. 3 may be suitably secured to the top of the head, most internal combustion engines having bosses normally employed for fastening the cover for the valve actuating mechanism in position which bosses are suitable for attaching the standards 114. Certain types of internal combustion engins having mechanical valve lifters have a machined ball 118 on the end of a downwardly extending stud adjustably secured in one end of the valve rocker arm 120. The ball 118 has its lower surface engaged in a socket in the upper end of the valve push rod 122 and has a machined upper surface which may be engaged by a fork member 124 shown in detail in Figs. 9 and 10 secured to the lower end of the extension plunger 26 of the dial indicator holding means by a screw 126. The screw 126 has an enlarged head and extends through a bore 128 in the fork member 124 and through a bore in a collar 130 which is positioned between the fork member 124 and the end of the extension plunger 26. The fork member 124 extends laterally of the extension plunger 60 and has an accurately machined slot 132 which engages the upper surface of the ball 118.

In employing the gauge shown in Fig. 8, it is merely necessary to remove the usual cover from the top of the cylinder head and to attach the standards 114 carrying the bar 116. After the fork member 124 has been installed on the end of the extension plunger 26, the holding means 22 may be placed in any one of the notches 100 of the bar 116 so that the collar 94 engages in the recess 98 surrounding such notch 100, the notches 100 being spaced along the bar 116 so as to properly position the holding means 22 to enable the fork member 124 to engage the top surface of each ball 118. The valve spring 119 for each valve retains the ball 118 firmly against the corresponding push rod 122 and the lower end of such push rod firmly in engagement with the corresponding valve lifter (not shown). The spring 66 within the holding means 22 maintains the fork member 124 in engagement with the upper surface of the ball 118 and the subsequent procedure for measuring the throw of the cam may be exactly the same as described with respect to Fig. 1. That is to say, the brake is released from the plunger 28 of the dial indicator and the engine slowly turned over until a minimum reading of the dial indicator is obtained. For this operation a possible alternative procedure with mechanical valve lifters is to leave the brake engaged and manually press the usual knob 134 at the upper end of the plunger 28 of the dial indicator downwardly while obtaining a minimum reading. This is possible with mechanical valve lifters containing no spring but it is not advisable with hydraulic valve lifters since there is danger of compressing the spring therein so as to obtain an incorrect reading. After a minimum reading has been obtained, the dial of the dial indicator is rotated to bring the zero graduation under the indicator needle. The engine is then again further turned over to at least carry the lobe of the cam past its maximum valve lifting position. Since the brake is then engaged against the plunger of the dial indicator, a maximum reading is obtained which corresponds to the throw of the cam being measured. The two types of adapters, namely, the extension rod 104 or the fork member 124, which are positioned between a part moved by a cam on the camshaft and the plunger 28 of the dial indicator can be employed to measure the throw of the cams on most internal combustion engines of the valve-in-head type, but it is apparent that other types of adapters can be employed for other engines.

I claim:

1. A camshaft gauge for measuring the throw of the cams on the camshaft of an internal combustion engine having valves in the cylinder head thereof, support means for attachment to said head, a dial indicator, holding means carrying said dial indicator for releasably attachment to said support means, said dial indicator having the end of an actuating plunger extending therefrom, actuating means positioned between said end of said plunger and a part of said engine moved by each of said cams, said support means including a bar extending longitudinally of said head and having a plurality of notches spaced therealong for positioning said holding means in selected positions along said bar, said holding means having a cylindrical body portion fitting said notches and releasable clamping means engaging the upper and lower surfaces of said bar.

2. A camshaft gauge for measuring the throw of the cams on the camshaft of an internal combustion engine having valves in the cylinder head thereof, support means for attachment to said head, a dial indicator, holding means carrying said dial indicator for releasably attachment to said support means, said dial indicator having the end of an actuating plunger extending therefrom, actuating means positioned between said end of said plunger and a part of said engine moved by each of said cams, friction brake means for holding said actuating plunger in a position corresponding to the extreme position to which said part is moved by each of said cams, said support means including a bar extending longitudinally of said head and having a plurality of notches spaced therealong for positioning said holding means in selected positions along said bar, said holding means having a body portion fitting said notches and releasable clamping means engaging the upper and lower surfaces of said bar.

3. A camshaft gauge for measuring the throw of the cams on the camshaft of an internal combustion engine having valves in the cylinder head thereof, support means for attachment to said head, a dial indicator, holding means carrying said dial indicator for releasably attachment to said support means, said dial indicator having the end of an actuating plunger extending therefrom, actuating means positioned between said end of said plunger and a part of said engine moved by each of said cams, friction brake means for holding said actuating plunger in a position corresponding to the extreme position to which said part is moved by each of said cams, said support means including a bar extending longitudinally of said head and having a plurality of notches spaced therealong for positioning said holding means in selected positions along said bar, said holding means having a body portion fitting said notches and releasable clamping means engaging the upper and lower surfaces of said bar, said actuating means including an extension plunger reciprocable in said body portion in alignment with said actuating plunger and a rod secured to said extension plunger for extending into said engine into engagement with a valve lifter of said engine.

4. A camshaft gauge for measuring the throw of the cams on the camshaft of an internal combustion engine having valves in the cylinder head thereof, support means for attachment to said head, a dial indicator, holding means carrying said dial indicator for releasably attachment to said support means, said dial indicator having the end of an actuating plunger extending therefrom, actuating means positioned between said end of said plunger and a part of said engine moved by each of said cams, friction brake means for holding said actuating plunger in a position corresponding to the extreme position to which said part is moved by each of said cams, said support means including a bar extending longitudinally of said head and having a plurality of notches spaced therealong for positioning said holding means in selected positions along said bar, said holding means having a body portion fitting said notches and releasable clamping means engaging the upper and lower surfaces of said bar, said actuating means including an extension plunger reciprocable in said body portion in alignment with said actuating plunger and a fork member secured to said extension plunger for engaging the upper surface of a push rod engaging portion of a rocker arm of said engine.

References Cited in the file of this patent

UNITED STATES PATENTS

| | | |
|---|---|---|
| 1,364,534 | Walter | Jan. 4, 1921 |
| 1,405,083 | Wilson | Jan. 31, 1922 |

(Other references on following page)

UNITED STATES PATENTS

| | | |
|---|---|---|
| 1,758,271 | Zitzmann | May 13, 1930 |
| 1,877,477 | Gladding | Sept. 13, 1932 |
| 2,451,123 | Schultz | Oct. 12, 1948 |
| 2,474,294 | Weeks | June 28, 1949 |
| 2,575,945 | De Vlieg | Nov. 20, 1951 |
| 2,642,047 | Johnson | June 16, 1953 |
| 2,662,298 | Cole | Dec. 15, 1953 |
| 2,739,289 | Carter | Mar. 27, 1956 |

FOREIGN PATENTS

| | | |
|---|---|---|
| 227,940 | Great Britain | Jan. 27, 1925 |
| 256,261 | Switzerland | Feb. 16, 1949 |

U. S. DEPARTMENT OF COMMERCE

PATENT OFFICE

CERTIFICATE OF CORRECTION

Patent No. 2,827,710

March 25, 1958

Dewey H. Campbell

It is hereby certified that error appears in the printed specification of the above numbered patent requiring correction and that the said Letters Patent should read as corrected below.

Column 3, line 54, for "filters" read -- lifters --; line 75, for "lifted" read -- lifter --; column 4, line 72, for "engins" read -- engines --.

Signed and sealed this 20th day of May 1958.

(SEAL)
Attest:
KARL H. AXLINE
Attesting Officer

ROBERT C. WATSON
Commissioner of Patents